(12) United States Patent
Jiang et al.

(10) Patent No.: US 7,969,975 B2
(45) Date of Patent: Jun. 28, 2011

(54) DATA COLLECTION FROM CPE DEVICES ON A REMOTE LAN

(75) Inventors: Baofeng Jiang, Pleasanton, CA (US); Jian Li, San Ramon, CA (US); Yew-Aik Michael Lim, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 173 days.

(21) Appl. No.: 12/257,598

(22) Filed: Oct. 24, 2008

(65) Prior Publication Data

US 2010/0103941 A1 Apr. 29, 2010

(51) Int. Cl.
- H04L 12/28 (2006.01)
- H04J 1/16 (2006.01)
- G08C 15/00 (2006.01)
- G06F 11/00 (2006.01)
- G01R 31/08 (2006.01)

(52) U.S. Cl. ......... 370/389; 370/252; 370/401; 709/230

(58) Field of Classification Search .......... 370/241–252, 370/352–357, 389–401; 709/220–223, 224–229
See application file for complete search history.

(56) References Cited

U.S. PATENT DOCUMENTS

| | | | |
|---|---|---|---|
| 6,480,748 B1 * | 11/2002 | Gerszberg et al. | 700/21 |
| 6,580,727 B1 * | 6/2003 | Yim et al. | 370/463 |
| 7,590,129 B2 * | 9/2009 | Absillis | 370/401 |
| 7,657,633 B2 * | 2/2010 | Jones et al. | 709/227 |
| 7,778,234 B2 * | 8/2010 | Cooke et al. | 370/351 |
| 2003/0172170 A1 * | 9/2003 | Johnson et al. | 709/230 |
| 2005/0220143 A1 * | 10/2005 | DelRegno et al. | 370/471 |
| 2006/0029083 A1 * | 2/2006 | Kettlewell et al. | 370/401 |
| 2007/0061460 A1 * | 3/2007 | Khan et al. | 709/225 |
| 2007/0201508 A1 * | 8/2007 | Blackford et al. | 370/466 |
| 2010/0030875 A1 * | 2/2010 | Visser et al. | 709/220 |
| 2010/0054266 A1 * | 3/2010 | Bouchat et al. | 370/401 |

OTHER PUBLICATIONS

DSL Home-Technical Working Group, *Technical Report: DSL Forum TR-069: CPE WAN Management Protocol.* May 2004, pp. 1-109.

DSL Home-Technical Working Group, *Technical Report: DSL Forum TR-098: DSLHome™ Internet Gateway Device—Version 1.1—Data Model for TR-069.* Sep. 2005, pp. 1-96.

* cited by examiner

*Primary Examiner* — M. Phan
(74) *Attorney, Agent, or Firm* — Hope Baldauff Hartman, LLC (57) ABSTRACT

Methods, systems, and computer-readable media for collecting data from CPE devices located on a remote LAN are provided. Communication is established over a WAN with a gateway attached to the LAN. The gateway is then used to enumerate the CPE devices on the LAN. A firewall pinhole is created in the gateway for each CPE device on the LAN, and communication is established through the pinholes to the CPE devices to collect the desired data.

17 Claims, 4 Drawing Sheets

DATA COLLECTION FROM CPE DEVICES ON A REMOTE LAN

BACKGROUND

This disclosure relates generally to the field of network management. More specifically, the disclosure provided herein relates to remotely accessing customer-premises equipment ("CPE") devices located on a local area network ("LAN") across a connected wide area network ("WAN").

Many network service providers ("NSP") have leveraged their Internet Protocol ("IP") WAN to provide an expanded line of services to customers beyond traditional Internet connectivity, such as television and telephone services. This has resulted in an increase in the number and diversity of CPE devices located in a customer's home or office. These CPE devices are often located on a LAN on the customer's premises that is connected to the NSP's WAN through a gateway. The gateway often acts as a firewall between the WAN and the LAN, making the CPE devices inaccessible remotely for administration or collection of operational (status) and performance data by the NSP.

Protocols and standards exist for accessing and managing CPE devices located on a remote customer-premises LAN, such as that described in the Broadband Forum's Technical Report TR-069 entitled "CPE WAN Management Protocol." However, these protocols often require that the gateway and the CPE devices implement uniform protocol stacks and technology, requiring the manufacturers of the various devices to work together to implement the standard. In addition, these solutions may not be scalable or may require too much overhead for implementation by a large NSP.

SUMMARY

It should be appreciated that this Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for collecting data from CPE devices located on a remote LAN. According to one aspect, a method is provided that entails establishing communication over a WAN with a gateway attached to the LAN. The gateway is then used to enumerate the CPE devices on the LAN. A firewall pinhole is created in the gateway for each CPE device on the LAN, and communication is established through the pinholes to the CPE devices to collect the desired data.

In another aspect, a system for collecting data from CPE devices on a remote LAN is provided. The system includes a gateway connected between a WAN and the LAN that is capable of enumerating the CPE devices connected to the LAN and establishing firewall pinholes for allowing communication from the WAN to the CPE devices on the LAN. The system also includes a collector module that communicates with the gateway over the WAN to enumerate the CPE devices on the LAN, configure the firewall pinholes in the gateway for each CPE device, and establish communication with the CPE devices through the firewall pinholes to collect the desired data from the devices.

In yet a further aspect, a computer-readable storage medium is provided that contains executable instructions that cause a computer to collect data from CPE devices located on a remote LAN. The computer establishes communication over a WAN with a gateway attached to the LAN and uses facilities of the gateway to enumerate the CPE devices on the LAN. The computer then determines a data collection interface for each CPE device based on the type of the device and configures a firewall pinhole in the gateway for communication with the CPE device using a communication protocol corresponding to the data collection interface. The computer establishes communication with the CPE device through the pinhole using the communication protocol and collects the desired data from the device. The collected data is stored in a CPE device datastore.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for collecting data over a WAN from CPE devices located on a remote, private LAN. Utilizing the technologies described herein, an NSP can establish communication over the WAN to each CPE device on a customer's premises LAN to collect operational, performance, and configuration data while utilizing the existing functionality and capabilities of the CPE devices, thereby eliminating the need to implement a complex and consistent set of protocols and interfaces across different device types and manufacturers.

Figure 1:
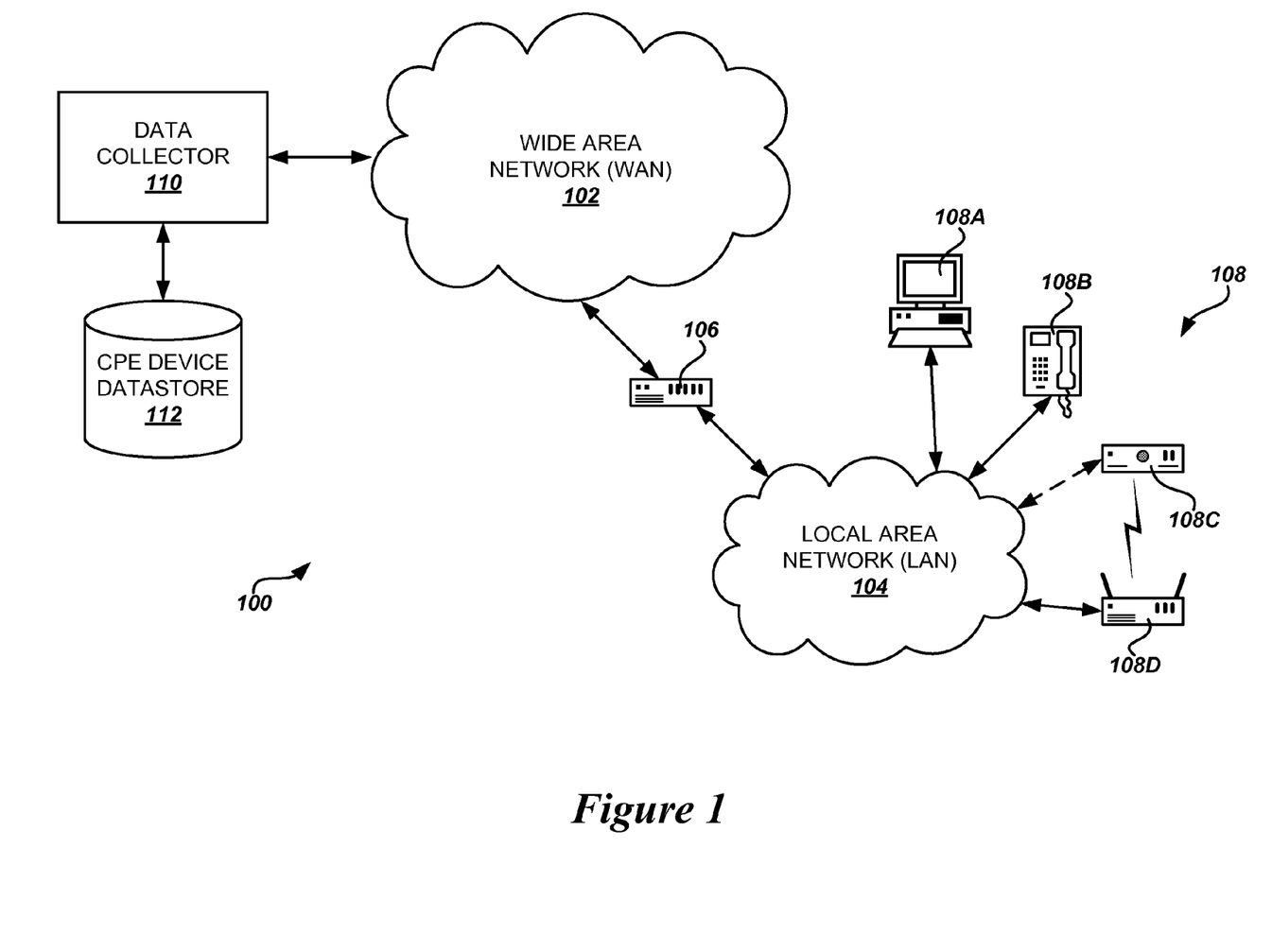
FIG. 1 is a block diagram illustrating an operating environment for remotely collecting data from CPE devices located on a private LAN, in accordance with exemplary embodiments.

In the following detailed description, references are made to the accompanying drawings that form a part hereof, and that show by way of illustration specific embodiments or examples. In referring to the drawings, it is to be understood that like numerals represent like elements through the several figures, and that not all components described and illustrated with reference to the figures are required for all embodiments. Referring now to FIG. 1, an illustrative operating environment 100 and several hardware and software components for collecting data from CPE devices located on a remote LAN is shown, according to embodiments.

The environment 100 includes a wide area network ("WAN") 102. According to one embodiment, the WAN is a an Internet Protocol ("IP") backbone network, such as that provided by a network service provider ("NSP"), upon which flows a variety of Internet traffic, including, but not limited to, Web browsing, email, instant messaging ("IM"), file sharing, Voice over IP ("VoIP"), IP television ("IPTV"), and streaming media. In addition, the NSP may also provide closed or proprietary services across the WAN 102, including telephone, television, teleconferencing, media services, content distribution, credit-card processing, virtual private networks ("VPN"), and other services.

The operating environment also includes a local area network ("LAN") 104. In one embodiment, the LAN 104 is located on a customer's premises and may consist of a wired Ethernet network, a wireless Wi-Fi network, a HomePNA™ network, a power line network, such as HOMEPLUG® from HomePlug Powerline Alliance, Inc. of San Ramon, Calif., or any combination of these and other physical networking components known in the art.

The LAN 104 is connected to the WAN 102 by a gateway 106, according to embodiments. The gateway 106 provides the routing of IP and other network traffic between the LAN 104 and the WAN 102. The gateway 106 may be an individual device that incorporates both the network routing functionality as well as a network bridge, such as a DSL modem or cable modem, or it may consist of two or more separate devices. In one embodiment, the gateway 106 also acts as a firewall, preventing unauthorized access to devices on the LAN 104 from the WAN 102, as will be described in more detail below in regard to FIG. 2.

A number of customer-premises equipment ("CPE") devices 108A-108D (referred to herein collectively as CPE devices 108) are attached to the LAN 104, according to exemplary embodiments. Each of the CPE devices 108 may be designed to access a particular service provided by the NSP across the WAN 102. For example, one CPE device 108A may be a personal computer ("PC") with a network interface adapter that is used to access the Internet across the WAN 102 for Web browsing, email, IM, etc. Another CPE device 108B may be an IP telephone which allows telephone calls to be placed over the WAN 102 utilizing VoIP services provided by the NSP. In a further example, one CPE device 108C may be a set-top-box ("STB") designed to access television and other media content over the WAN 102 utilizing an IPTV service of the NSP. It will be appreciated that any number and type of CPE devices 108 known in the art may be attached to the customer's LAN 104 beyond those described herein.

Communication of the CPE devices 108 on the LAN 104 with the corresponding services on the WAN 102 may be facilitated by the gateway 106. For example, the gateway 106 may forward IP traffic from a particular CPE device, such as the PC CPE device 108A, to the WAN 102 using network address translation ("NAT"). Some of the CPE devices 108 attached to the LAN 104 may also act as sub-gateways to additional devices, incorporating network bridge and/or routing functionality within the device. For example, one CPE device 108D may be a wireless access point ("WAP") and router that routes IP and other network traffic between the LAN 104 and a Wi-Fi network. Other CPE devices, such as the STB CPE device 108C described above, may communicate with the corresponding services on the WAN 102 by communicating wirelessly through the WAP CPE device 108D onto the LAN 104, and then through the gateway 106 onto the WAN, as further illustrated in FIG. 1.

In order to manage the network, it may be desirable for a NSP to collect data from the CPE devices 108 located on the customer's LAN 104. This data may include, but is not limited to, operational data indicating the status and health of the CPE devices 108, performance data including logs and performance statistics indicating the operational efficiency of the devices and the network, and configuration data indicating the capabilities and configuration of the devices. The data may be used to measure the performance of the network; establish quality-of-service ("QoS") levels; identify devices or services that require troubleshooting or modification; or any number of other purposes that would be apparent to one skilled in the art.

A data collector 110 connected to the WAN 102 communicates with the CPE devices 108 to collect the desired data, according to embodiments. The data collector 110 may be an application software module executing on a network server computer, or it may a specialty device connected to the WAN 102. The data collector 110 connects to a data collection interface on each of the CPE devices 108 to collect the desired data, as will be described in more detail below in regard to FIG. 3. The collected data is then stored in a CPE device datastore 112. The CPE device datastore 112 may be located in non-volatile storage within the network server executing the data collector 110, or it may be located in a storage mechanism external to the data collector.

Figure 2:
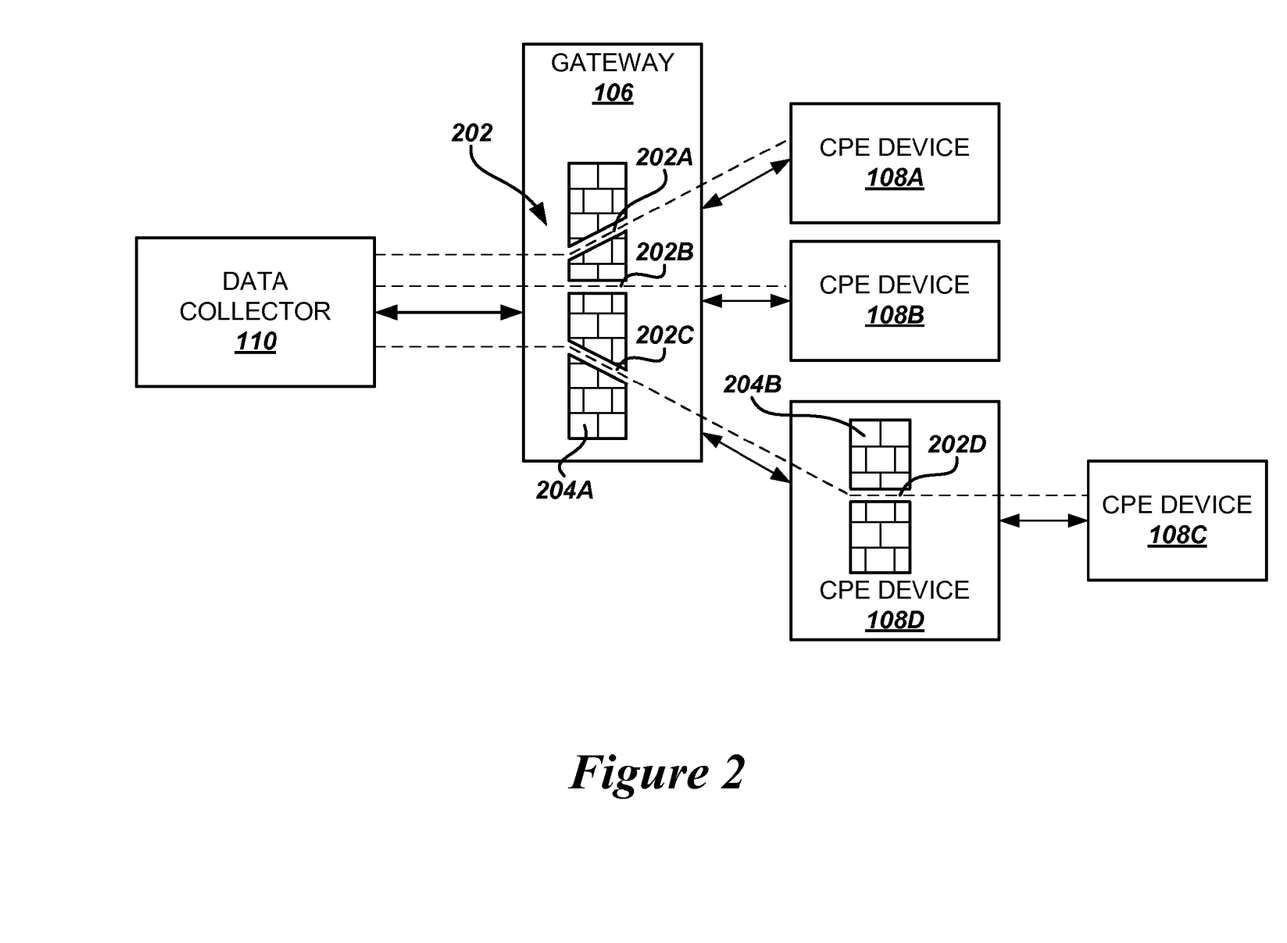
FIG. 2 is a block diagram providing further details of the operating environment, in accordance with exemplary embodiments.

As described above, the gateway 106 may act as a firewall between the WAN 102 and the LAN 104, preventing the data collector 110 from being able to communicate directly with the CPE devices 108 on the LAN. According to one embodiment, in order for the data collector 110 to communicate with the CPE devices 108, a firewall pinhole is established in the firewall for each of the CPE devices 108 with which the data collector will communicate. As illustrated in FIG. 2, a firewall pinhole, such as the firewall pinholes 202A-202D (referred to herein collectively as firewall pinholes 202), is a port in a firewall, such as the firewalls 204A-204B, that allows applications external to the firewall, such as the data collector 110, to communicate with devices inside the firewall, such as the CPE devices 108A-108D.

For example, in order for the data collector 110 to communicate with the CPE device 108A, the firewall pinhole 202A is established in the firewall 204A of the gateway 106. Similarly, the firewall pinholes 202B and 202C are established in the firewall 204A to facilitate communication between the data collector 110 and the CPE devices 108B and 108D, respectively. When the CPE device 108C is located behind a sub-gateway, such as the WAP CPE device 108D described above in regard to FIG. 1, the additional firewall pinhole 202D may need to be established in the firewall 204B of the sub-gateway CPE device 108D in order to allow communication from the data collector 110 to reach the remote CPE device 108C, as further illustrated in FIG. 2.

The gateway 106 facilitates the configuration of the firewall pinholes 202 required by the data collector 110, according to one embodiment. The configuration of each of the firewall pinholes 202 may consist of creating a mapping between an external port number with which the data collector 110 will communicate, and an internal address and port number to which the communication will be forwarded. The specific parameter values of the mapping will depend on a number of factors, including the internal addresses assigned to the CPE devices 108 on the LAN 104 and the communication protocol to be used by the data collector 110 to access the data collection interface of each CPE device, as will be described in more detail below in regard to FIG. 3. It will be appreciated by one skilled in the art that the firewall pinholes 202 may be established using additional or differing parameters than those described above, and that the TCP/IP port forwarding functionality required by the data collector 110 may be accomplished using other methods than the firewall pinholes 202 described herein. It is intended that all such configurations and methods be included within the scope of the present invention.

Figure 3:
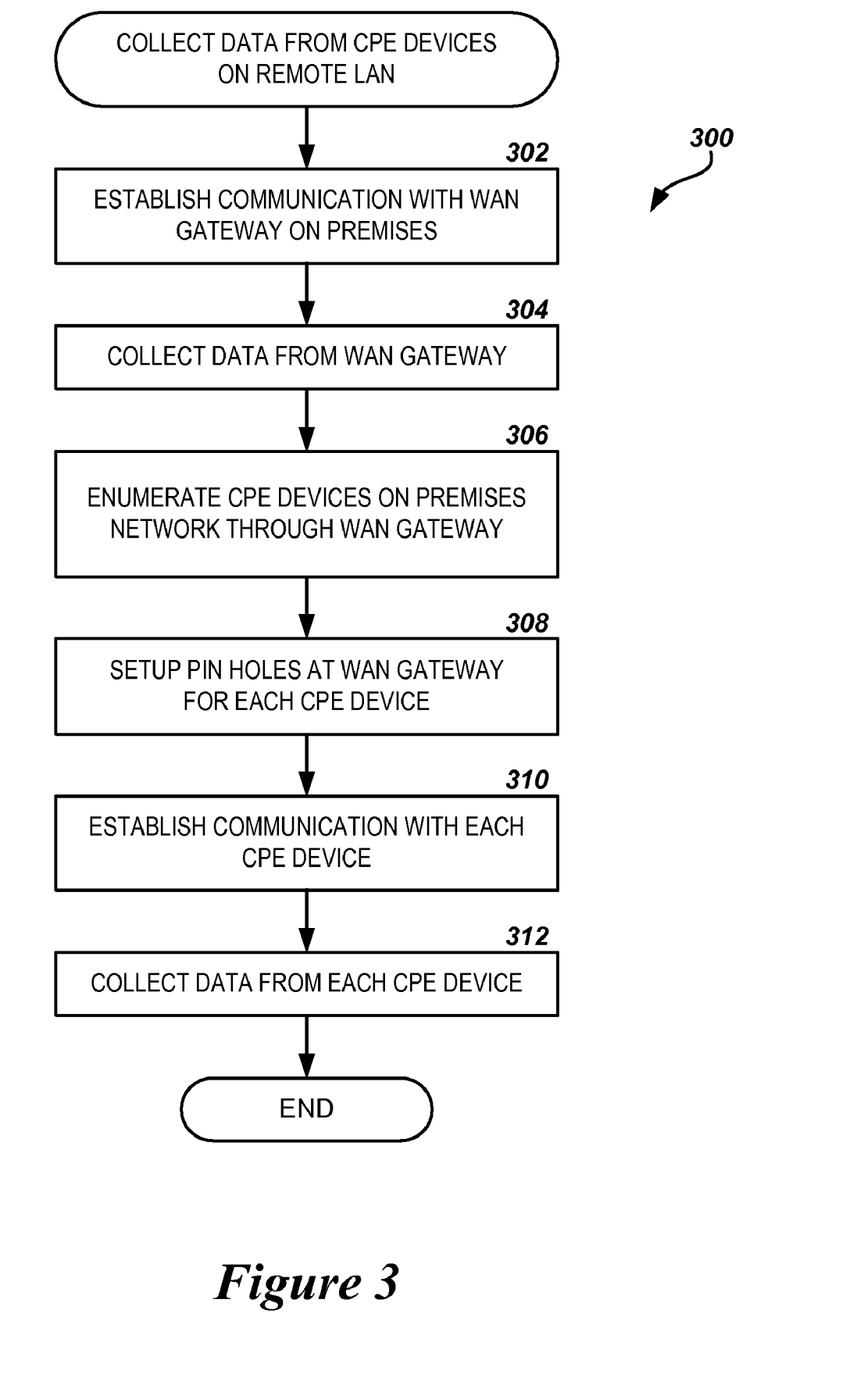
FIG. 3 is a flow diagram illustrating one method for collecting data from CPE devices on a remote LAN, in accordance with exemplary embodiments.

Referring now to FIG. 3, additional aspects regarding the operation of the components and software modules described above in regard to FIGS. 1 and 2 will be provided. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

It should also be appreciated that, while the operations are depicted in FIG. 3 as occurring in a sequence, various operations described herein may be performed by different components or modules at different times. In addition, more or fewer operations may be performed than shown, and the operations may be performed in a different order than illustrated in FIG. 3.

FIG. 3 illustrates an exemplary routine 300 for collecting data from CPE devices, such as the CPE devices 108, located on a remote LAN, such as the LAN 104. The routine 300 begins at operation 302, where the data collector 110 establishes communication over the WAN 102 with the gateway 106 connected to the LAN 104 located on the customer's premises. Because the gateway 106 is connected directly to the WAN 102, the data collector 110 may establish communication directly with the gateway using the WAN address of the gateway.

According to embodiments, the gateway 106 provides an administration interface that the data collector 110 uses to communicate with the gateway. The protocol used by the administration interface depends on the type of gateway 106 utilized by the customer and/or the NSP. For example, one gateway 106 may provide a Web-based administration interface that is accessed by the data collector 110 to collect data, enumerate the CPE devices 108, and configure the firewall pinholes 202, as is described in more detail below in regard to operations 304, 306, and 308. It will be appreciated that the gateway 106 may support any number of protocols or methods for communication from the data collector 110, including, but not limited to, Web services, remote-procedure calls ("RPCs"), or a simple network management protocol ("SNMP") interface. In addition, the data collector 110 may be programmed to recognize and communicate with a number of different types of gateways located on the WAN 102.

Once communication with the gateway 106 has been established, the routine 300 proceeds from operation 302 to operation 304, where the data collector 110 may collect data from the gateway 106. For the same reasons that data is collected from the individual CPE devices 108 on the customer's LAN 104, the NSP may desire to collect operational, performance, and configuration data from the gateway 106 in order to measure the performance of the network, establish QoS levels, or identify devices or services that require troubleshooting. The collected data is stored in the CPE device datastore 112.

From operation 304, the routine 300 proceeds to operation 306, where the data collector 110 detects the CPE devices 108 on the customer's LAN 104. In one embodiment, the detection of the CPE devices 108 is accomplished by using the administration interface of the gateway 106 to enumerate the attached CPE devices 108. In order to provide IP routing functionality, DHCP functionality, NAT functionality, and/or other services, the gateway 106 may maintain a list of connected devices, including the media access control ("MAC") address and any assigned IP address of the device. In one embodiment, the data collector 110 accesses the list of connected devices on the gateway 106 to enumerate the CPE devices 108 on the LAN 104 as well as to determine the appropriate data collection interface to use with each device in order to collect the desired data.

According to embodiments, each of the CPE devices 108 provides a data collection interface utilized by the data collector 110 to collect the desired data. A data collection interface may be an administrative Website built into the CPE device which can be accessed by the data collector 110 to collect the data, or the CPE device may implement a set of Web services that the data collector may utilize to retrieve the data. It will be appreciated that the CPE devices 108 may incorporate a wide variety of data collection interfaces known in the art, including, but not limited to, an SNMP interface, a file-transfer protocol ("FTP") interface for downloading log files, or an application programming interface ("API") implemented through RPCs. All of the CPE devices 108 connected to the customer's LAN 104 may use a standard, consistent data collection interface, or each device may have a different data collection interface, depending on the manufacturers and types of devices present. Just as in the case of the gateway 106, the data collector 110 may be programmed to collect data from a number of different data collection interfaces on a variety of CPE devices 108.

In one embodiment, the data collector 110 determines the appropriate data collection interface to use with each of the CPE devices 108 by analyzing the MAC address of each device. For example, convention provides that the first three bytes of a standard 6-byte MAC address is an organizationally unique identifier ("OUI") that uniquely identifies the manufacturer of the device. Many manufacturers may further use the fourth byte of the MAC address to identify the device type. Therefore, after extracting the OUI from the MAC address of a particular CPE device to determine the manufacturer, the data collector 110 can then use a lookup list to find the device type from the fourth byte of the MAC address for the manufacturer, and retrieve the appropriate data collection interface to be used to collect data from the device.

The routine 300 proceeds from operation 306 to operation 308, where the data collector 110 establishes a firewall pinhole, such as the firewall pinholes 202, for each of the CPE devices 108 on the LAN 104 based upon the data collection interface determined for the device in operation 306. According to embodiments, each data collection interface will have a corresponding communication protocol that is required to utilize the data collection interface. For example, a CPE device with a data collection interface consisting of a built-in administrative Website or set of Web services will require the data collector 110 to utilize the hypertext transfer protocol ("HTTP") to collect data from the device through the data collection interface. The CPE devices 108 implementing FTP or SNMP-based data collection interfaces will require communication through the FTP or SNMP communication protocols, respectively.

The configuration of each of the firewall pinholes 202 depends upon the communication protocol required to communicate with the associated CPE device. For example, for the CPE device 108C that requires the HTTP communication protocol, the data collector 110 establishes the firewall pinhole 202C in the gateway 106 specifying the assigned IP address of the CPE device as the internal address and a port number of 80 as the internal port number. It will be appreciated that the manufacturer of a particular CPE device may require a different port number be utilized to access the data collection interface determined for the device using the HTTP protocol, such as 8080.

The external port number configured for the firewall pinhole 202C may be any valid port number that is unique on the gateway 106 for the associated CPE device 108C. In this way, each of the CPE devices 108 on the customer's LAN 104 connected to the gateway 106 will have its own unique external port number, allowing the data collector 110 to communicate with a particular CPE device over the WAN 102 by specifying the WAN IP address of the gateway 106 and the external port number of the firewall pinhole associated with the CPE device. For example, the data collector 110 may utilize an external port number of 10,001 in configuring the firewall pinhole 202C in the gateway 106 to allow communication with the CPE device 108C. When the data collector 110 wishes to collect data from the CPE device 108C on the LAN 104, the data collector can communicate with the device by connecting to the WAN IP address of the gateway 106 and the port number of 10,001.

In one embodiment, the data collector 110 may select a random number between 10,001 and 49,151 as the external port number for each of the CPE devices 108 on the LAN. This provides a level of security for the CPE devices 108 through obscurity of the external port numbers of the firewall pinholes 202, making discovery of the firewall pinholes and the associated internal CPE devices more difficult. It will be appreciated that an NSP may employ other security mechanisms known in the art to secure the firewall pinholes 202 and the associated CPE devices 108 on the LAN 104 from invasion from the WAN 102, including, but not limited to, configuring the firewall pinholes 202 with access control lists, limiting connections to the devices to servers belonging to the NSP.

According to another embodiment, once the CPE devices 108 attached to the customer's premises LAN 104 have been enumerated, the data collection interface for each device has been determined, and the firewall pinholes 202 for the devices have been established, the data collector 110 stores a list of the CPE devices along with the data collection interface and assigned external port number for each in the CPE device datastore 112 and associates the list with the customer's gateway 106 address. In this way, in subsequent attempts by the data collector 110 to collect data from the CPE devices 108, the data collector need only retrieve the device collection interface and external port number from the CPE device datastore 112 for each CPE device in order to communicate with and collect data from the device.

From operation 308, the routine proceeds to operation 310, where the data collector 110 establishes communication with each of the CPE devices 108 over the WAN. The data collector 110 utilizes the communication protocol corresponding to data collection interface determined for each of the CPE devices 108 to connect to the WAN IP address of the gateway 106 and the external port number assigned to the firewall pinhole 202 associated with the device. Once communication is established with each of the CPE devices 108, the routine 300 proceeds to operation 312 where the data collector 110 utilizes the data collection interface to collect the desired data from the device. The collected data is then stored in the CPE device datastore 112.

According to one embodiment, the CPE devices 108 present the data for collection in a standard data model, like a public tree data model as described in Broadband Forum's Technical Report TR-098 entitled "Internet Gateway Device Data Model for TR-069." The tree data model provides flexibility in the data collection process, in that data can be collected selectively by leaf, branch, or whole tree. Utilizing a standard data model also allows a small number of data collectors to collect data from a large network within a short time window, saving on hardware and operation costs. From operation 312, the routine 300 ends.

Figure 4:
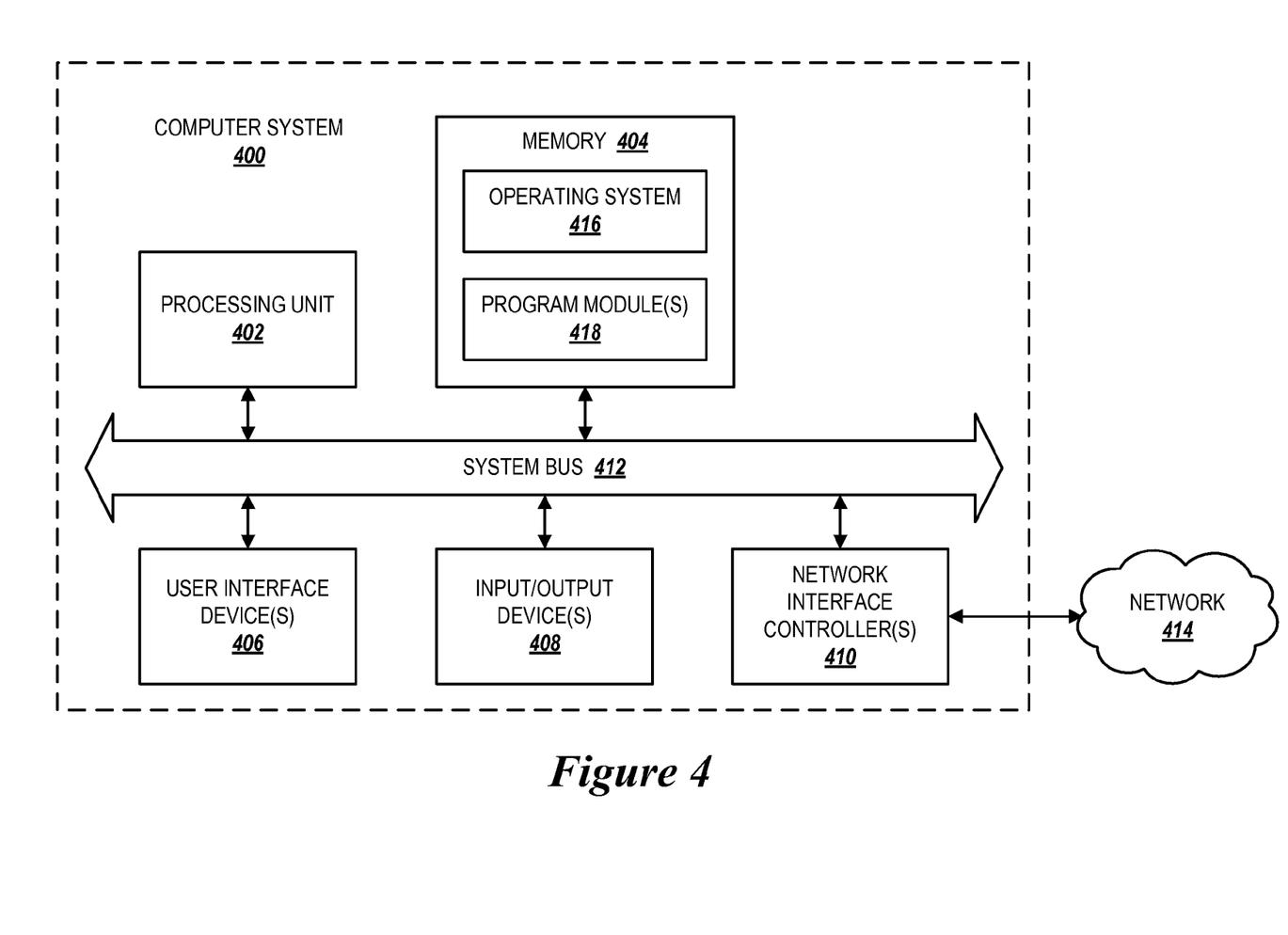
FIG. 4 is a block diagram showing an illustrative computer hardware and software architecture for a computing system capable of implementing aspects of the embodiments presented herein.

FIG. 4 is a block diagram illustrating a computer system 400 configured to collect data from CPE devices located on a remote LAN, in accordance with exemplary embodiments. The computer system 400 may be utilized to implement the data collector 110 described above in regard to FIG. 1. The computer system 400 may include a processing unit 402, a memory 404, one or more user interface devices 406, one or more input/output ("I/O") devices 408, and one or more network interface controllers 410, each of which is operatively connected to a system bus 412. The bus 412 enables bi-directional communication between the processing unit 402, the memory 404, the user interface devices 406, the I/O devices 408, and the network interface controllers 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 416 and one or more program modules 418, according to exemplary embodiments. Examples of operating systems, such as the operating system 416, include, but are not limited to, WINDOWS®, WINDOWS® CE, and WINDOWS MOBILE® from MICROSOFT CORPORATION, LINUX, SYMBIAN™ from SYMBIAN SOFTWARE LTD., BREW® from QUALCOMM INCORPORATED, MAC OS® from APPLE INC., and FREEBSD operating system. An example of the program module 418 includes the data collector 110 described above in regard to FIG. 1. In one embodiment, the program modules 418 are embodied in computer-readable media containing instructions that, when executed by the processing unit 402, perform the routine 300 for collecting data from CPE devices on a remote LAN, as described in greater detail above in regard to FIG. 3. According to further embodiments, the program modules 418 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400.

The user interface devices 406 may include one or more devices with which a user accesses the computer system 400. The user interface devices 406 may also include, but are not limited to, computers, servers, personal digital assistants, cellular phones, or any suitable computing devices. The I/O devices 408 enable a user to interface with the program modules 418. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network interface controllers 410 enable the computer system 400 to communicate with other networks or remote systems via a network 414. Examples of the network interface controllers 410 may include, but are not limited to, a modem, a radio frequency ("RF") or infrared ("IR") transceiver, a telephonic interface, a bridge, a router, or a network card. The network 414 may include a wireless network such as, but not limited to, a wireless local area network ("WLAN") such as a Wi-Fi network, a wireless wide area network ("WWAN"), a wireless personal area network ("WPAN") such as BLUETOOTH, a wireless metropolitan area network ("WMAN") such as a WiMAX network, or a cellular network. Alternatively, the network 414 may be a wired network such as, but not limited to, a WAN such as the Internet, a LAN such as an Ethernet network, a wired personal area network ("PAN"), or a wired metropolitan area network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for collecting data from customer-premises equipment devices located on a local area network, comprising:
    establishing communication over a wide area network with a gateway attached to the local area network;
    detecting a customer-premises equipment device on the local area network using the gateway;
    determining a data collection interface of the customer-premises equipment device;
    configuring a pinhole in the gateway for the customer-premises equipment device based upon a communication protocol corresponding to the data collection interface of the customer-premises equipment device;
    establishing communication with the customer-premises equipment device through the pinhole utilizing the communication protocol corresponding to the data collection interface of the customer-premises equipment device to communicate with the customer-premises equipment device through the pinhole; and
    collecting data from the customer-premises equipment device.

2. The method of claim 1, wherein the data collected from the customer-premises equipment device includes one or more of data regarding an operation of the customer-premises equipment device, data regarding a performance of the customer-premises equipment device, and data regarding a configuration of the customer-premises equipment device.

3. The method of claim 1, wherein the communication protocol corresponding to the data collection interface comprises hypertext transfer protocol.

4. The method of claim 1, wherein the communication protocol corresponding to the data collection interface comprises remote procedure calls.

5. The method of claim 1, wherein the communication protocol corresponding to the data collection interface comprises simple networking management protocol.

6. The method of claim 1, further comprising storing the data collected from the customer-premises equipment device in a customer-premises equipment device datastore.

7. The method of claim 6, further comprising storing information describing the customer-premises equipment device on the local area network in the customer-premises equipment device datastore.

8. The method of claim 7, wherein the information describing the customer-premises equipment device comprises information identifying the data collection interface determined for the customer-premises equipment device and information identifying the pinhole configured in the gateway for the customer-premises equipment device.

9. The method of claim 8, wherein a subsequent collection of data from the customer-premises equipment device comprises:
    retrieving the information describing the customer-premises equipment device from the customer-premises equipment device datastore;
    establishing communication with the customer-premises equipment device utilizing a communication protocol corresponding to the data collection interface identified in the information describing the customer-premises equipment device through the pinhole identified in the information describing the customer-premises equipment device;
    collecting data from the customer-premises equipment device; and
    storing the data collected from the customer-premises equipment device in the customer-premises equipment device datastore.

10. A system for collecting data from customer-premises equipment devices on a local area network, comprising:
    a memory for storing a program containing computer-executable instructions for collecting data from the customer-premises equipment devices on the local area network; and
    a processor functionally coupled to the memory, the processor being responsive to the computer-executable instructions and operative to:
        establish communication over a wide area network with a gateway connected between the wide area network and the local area network, the gateway operative to enumerate the customer-premises equipment devices on the local area network;
        detect a customer-premises equipment device on the local area network using the gateway;
        configure a pinhole in the gateway corresponding to the customer-premises equipment device;
        establish communication over the wide area network with the customer-premises equipment device through the pinhole corresponding to the customer-premises equipment device;
        collect data from the customer-premises equipment device, wherein the data collected from the customer-premises equipment device is stored in a customer-premises equipment device datastore;

determine a communication protocol for the customer-premises equipment device on the local area network to be utilized for communicating with the customer-premises equipment device;

configure the pinhole in the gateway corresponding to the customer-premises equipment device based upon the communication protocol determined for the customer-premises equipment device; and establish communication over the wide area network with the customer-premises equipment device utilizing the communication protocol determined for the customer-premises equipment device through the pinhole corresponding to the customer-premises equipment device.

11. The system of claim 10, wherein determining a communication protocol for the customer-premises equipment device comprises determining a media access control address of the customer-premises equipment device and selecting the communication protocol from a list of media access control address ranges and corresponding communication protocols.

12. The system of claim 10, wherein the communication protocol comprises one of a hypertext transfer protocol, a remote procedure call, a simple networking management protocol, and a simple object access protocol.

13. The method of claim 8, wherein the communication protocol comprises one of a hypertext transfer protocol, a remote procedure call, a simple networking management protocol, and a simple object access protocol.

14. The system of claim 10, wherein the processor is further operative to store information describing the customer-premises equipment device on the local area network in the customer-premises equipment device datastore.

15. The system of claim 14, wherein the information describing the customer-premises equipment device comprises information identifying the data collection interface determined for the customer-premises equipment device and information identifying the pinhole configured in the gateway for the customer-premises equipment device.

16. The system of claim 15, wherein the processor is further operative to:

retrieve the information describing the customer-premises equipment device from the customer-premises equipment device datastore;

establish communication with the customer-premises equipment device utilizing a communication protocol corresponding to the data collection interface identified in the information describing the customer-premises equipment device through the pinhole identified in the information describing the customer-premises equipment device;

collect data from the customer-premises equipment device; and store the data collected from the customer-premises equipment device in the customer-premises equipment device datastore.

17. The system of claim 15, wherein the communication protocol comprises one of a hypertext transfer protocol, a remote procedure call, a simple networking management protocol, and a simple object access protocol.

* * * * *